Aug. 15, 1972    M. SCHNEIDER    3,684,609
INSULATING PIPE ACCOUTERMENTS AND THE LIKE
Original Filed April 26, 1967    2 Sheets-Sheet 1
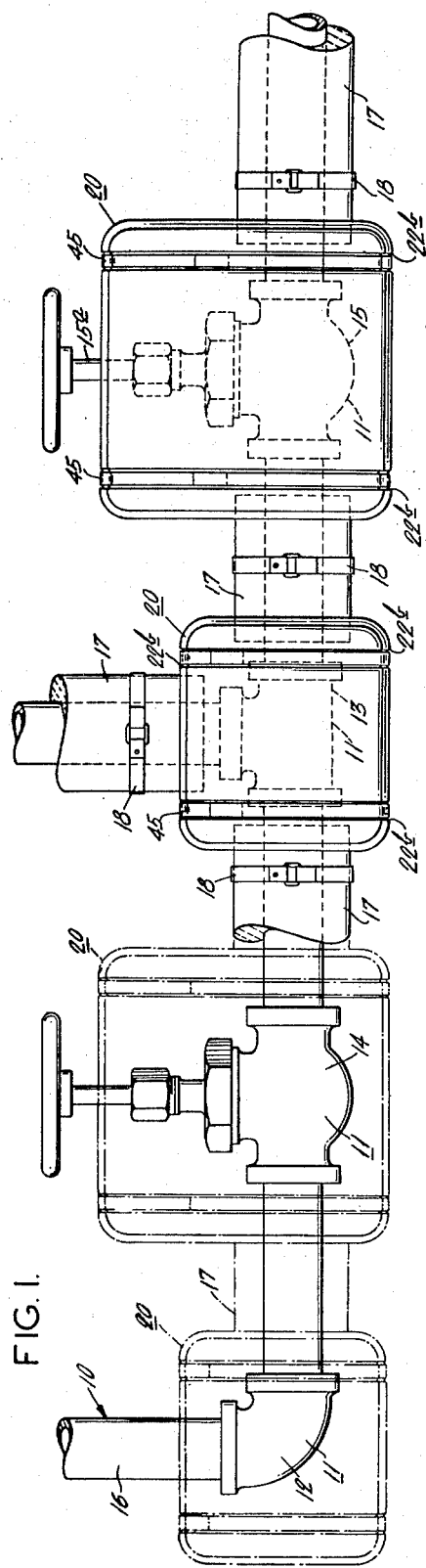
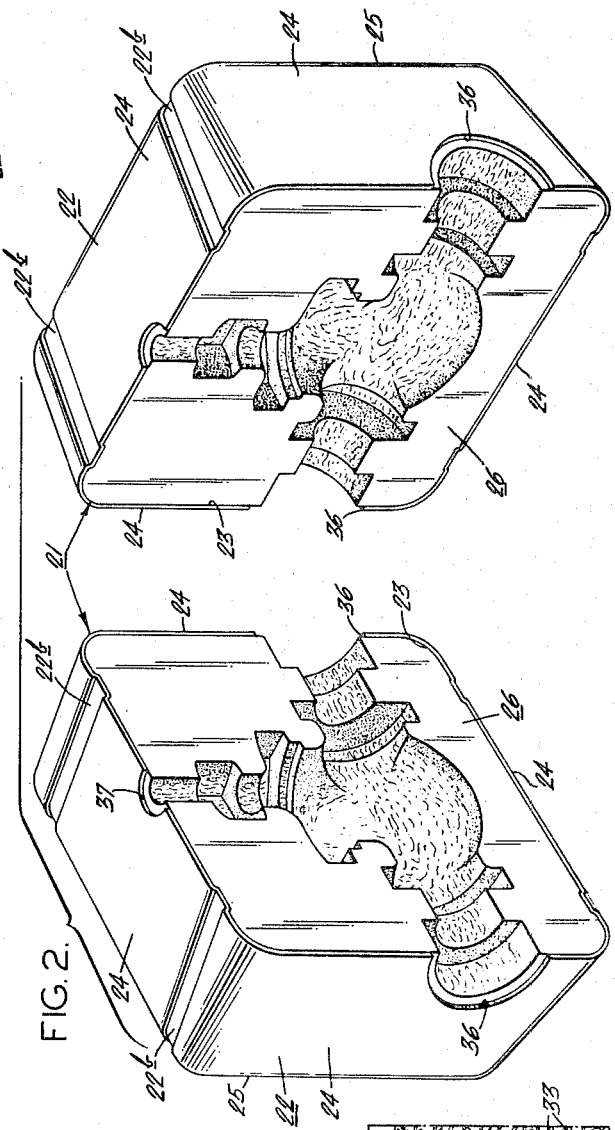
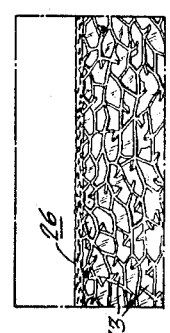
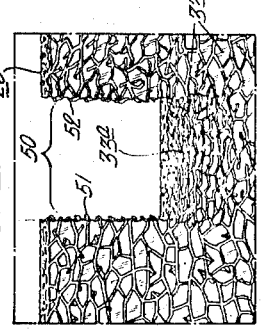
INVENTOR:
MARVIN SCHNEIDER
Howson & Howson
ATTYS.

Aug. 15, 1972    M. SCHNEIDER    3,684,609
INSULATING PIPE ACCOUTERMENTS AND THE LIKE
Original Filed April 26, 1967    2 Sheets-Sheet 2
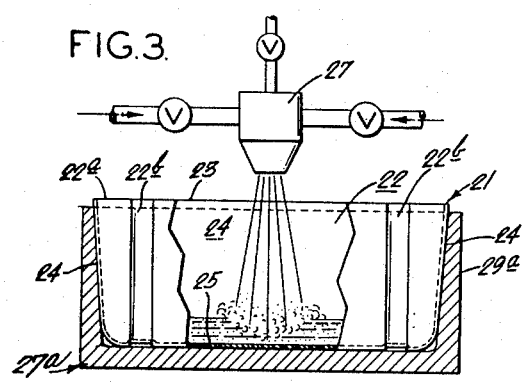
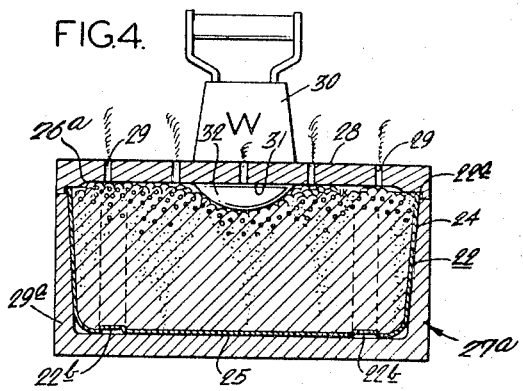
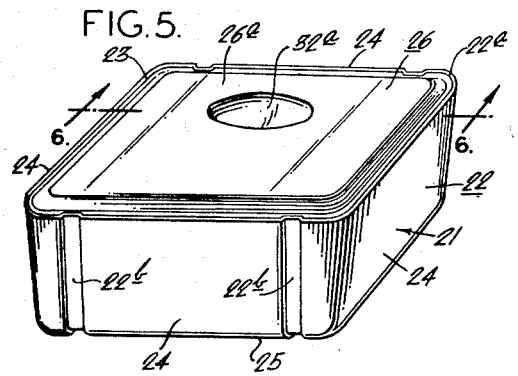
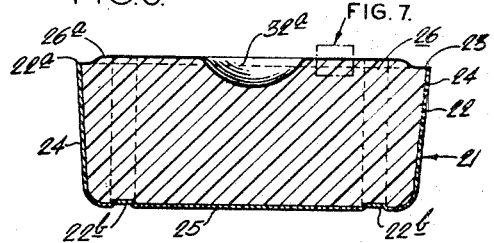
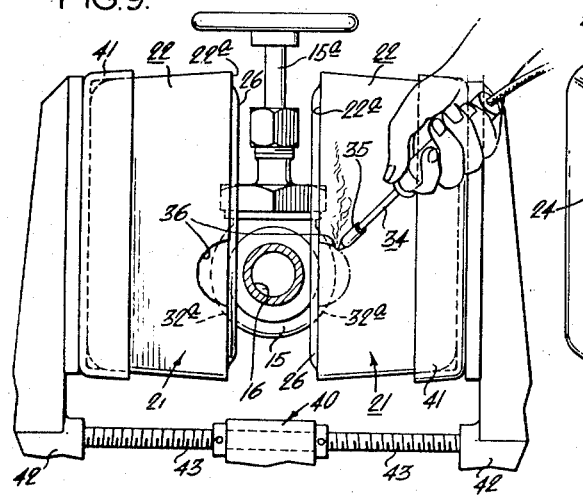
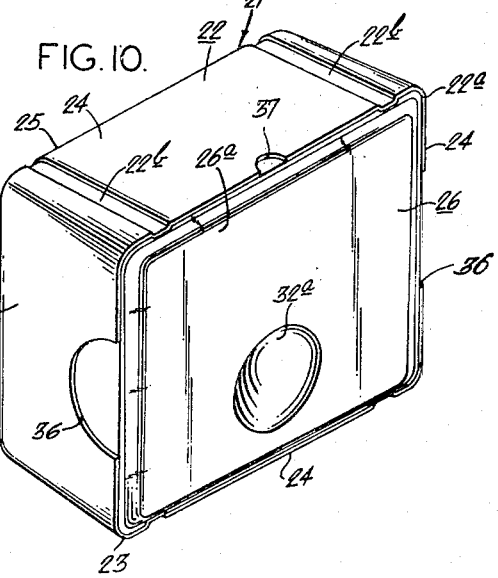
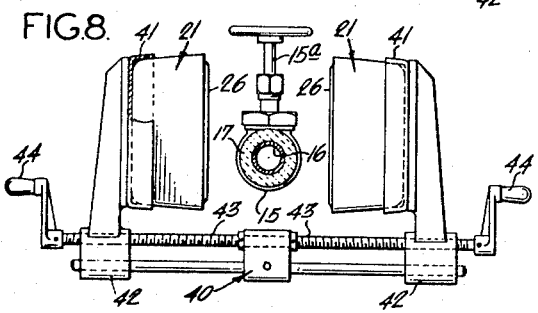
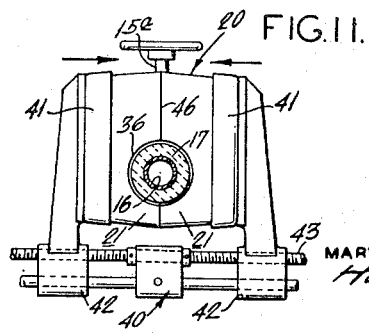
INVENTOR:
MARVIN SCHNEIDER
Howson &
Howson
ATTYS.

United States Patent Office 3,684,609
Patented Aug. 15, 1972

3,684,609
INSULATING PIPE ACCOUTERMENTS
AND THE LIKE
Marvin Schneider, 65 Brennan Drive,
Bryn Mawr, Pa. 19010
Original application Apr. 26, 1967, Ser. No. 633,802, now Patent No. 3,556,158. Divided and this application Jan. 11, 1971, Ser. No. 105,429
Int. Cl. B32b 31/00
U.S. Cl. 156—221                    4 Claims

ABSTRACT OF THE DISCLOSURE

This patent deals with insulating with insulators formed of a pair of blanks. Each blank comprises a rigid outer shell with one open face, and interiorly of the shell is a block or insert of a novel polyurethane foam. The blanks are used for insulating pipe accouterments such as valves, flanges, traps, etc. in which the accouterment being insulated acts as a die for forming the foam to substantially conform of the contour of the accounterment.

SUMMARY OF THE INVENTION

This application is a division of my application Ser. No. 633,802 filed Apr. 26, 1967, now U.S. Pat. No. 3,556,158.

The present invention relates to the method of applying insulators to pipe accouterments and the like, and more specifically relates to novel polyurethane foam blanks and the method of applying the foam blanks to pipe accouterments to utilize to maximum advantage the insulating qualities of the novel polyurethane foam.

In brief, the novel insulation for piping accouterments comprises at least a pair of blanks each including a rigid outer shell having at least one open side. A polyurethane foam block or insert is foamed in situ in the shell, the polyurethane foam having a compression yield strength of at least 5 p.s.i. and projecting outwardly of one open side for purposes which will become more evident hereinafter. In the preferred form the polyurethane foam has a coefficient of thermal conductivity (K) no greater than .16 B.t.u. per hour, per square foot, per inch length, per degree F. The blanks are dimensioned so that when positioned on opposite sides of the accouterment, open side to open side and forced together with the accouterment sandwiched therebetween, the blocks join or meet along at least some of their peripheral boundary (land area) thereby substantially enclosing or sheathing the accouterment. Thus the pipe accouterment acts as a die for molding the blocks of polyurethane foam in situ so as to substantially conform to the external configuration of the accounterment. In addition, several means may be utilized to cause the one blank to be held in mating relation against the other blank thereby insulating the accouterment.

STATE OF THE PRIOR ART

In insulating piping systems used for transmission of fluids and/or gases at temperatures above or below ambient, standard inexpensive insulation may be provided for the normally cylindrical piping. However, the normal pipe accouterments, which would include such elements as flanges, tees, elbows, reducers, valves, and the like, are difficult and expensive to insulate in that there are many varied shapes and sizes as opposed to the number of pipe shapes and sizes. For example in the instance of valves, there are several thousand different shapes and sizes in commercial use and even in one piping system it is customary to find many different valve configurations even with the same size pipe. In addition, many times valves are tailormade to accommodate various pressures and fluids or gases flowing therethrough. Thus it is impractical and/or overly expensive to premold or prefabricate valve insulating coverings for the specific shape and requirement of each individual valve.

In most commercial installations insulation is applied to the piping accouterments by time consuming and/or expensive methods. For example, a cement-like mix comprising magnesia and asbestos fibers and utilizing waterglass as a binder, is prepared, normally at the location where it is to be applied, and the mix is then trowelled onto the pipe accouterment and covered by wrapping with a material such as asbestos fabric. Insulation prepared in this manner has limitations; (1) while being serviceable, its heat insulating qualities are poor as compared with certain other insulators, and (2) it requires excessive time to apply and thus is expensive because of high labor costs, and (3) it is necessary that this insulation be destroyed when the need arises for servicing the accouterment.

Another conventional practice in applying insulators to pipe accouterments involves the use of oversized fiberglass pipe insulation allowing for the accouterments size, and cutting the insulation where necessary and joining tailored pieces to accommodate the accouterment to be insulated. In a like manner as before, the fiberglass body must be, for the most part, tailored to the individual valve by wrapping, fitting, and cutting and is therefore costly. In addition, fiberglass will tend to adsorb moisture which raises the "K" factor to an undesirable level.

One of the best insulators existing on the market today is foamed polyurethane having been expanded by a blowing or foaming agent of a halocarbon gas. Foamed polyurethane utilized as an insulator achieves a much lower coefficient of conductivity, or K factor, on the order of one-half (½) that of the fiberglass insulator, and approximately one-third (⅓) that of the wrapped mix, both herein-above described. However, the manner in which the foamed polyurethane is presently applied makes the insulation job overly expensive. Conventionally a mold is positioned to enclose the accouterment and then the formulation along with the foaming agent is placed in the mold and foaming occurs in place around the object. While this foam-in-place and form-in-place technique, utilizing polyurethane, provides a very acceptable insulator, the procedure of foaming-in-place while holding a mold so as to enclose the accouterment, is very costly and time consuming. In addition, unless the operation is carried out under the supervision of a competent field technician, which of course adds greatly to the expense, variable field conditions may cause undesirable and unreliable results.

The conventional commercial polyurethane foams utilized in the manner described above, are rigid foams and for reasons which will become evident hereinafter, are normally of relative high density and exhibit a compression yield of approximately 25 p.s.i. or higher. In order to provide a sufficiently low coefficient of thermal conductivity, which coefficient indicates the insulation value of the polyurethane, the polyurethane is normally blown or foamed with a fluoro-hydrocarbon gas. However, at temperatures below 23.7° F., the fluoro-hydrocarbon gases contained within the closed cells condense, leaving a partial vacuum in the individual cells. Thus, if the cell structures were substantially uniform, the compression yield must be, or necessity, at least equal to atmospheric pressure but because of slight inconsistencies in the homogeneity of the mass, compression yield in excess of 20–25 pounds per square inch are conventionally employed in form-in-place uses, especially at depressed temperature.

DESCRIPTION OF THE INVENTION

In view of the above, it is a principal object of the present invention to provide an insulator comprising a prefoamed block of polyurethane and a novel method of applying the same to pipe accouterments, which block has predetermined physical and thermal insulation properties so that upon forcing the block against a pipe accouterment, the block deforms and assumes a shape conforming to the contour of the accounterment.

Another object of the present invention is to provide a foamed polyurethane block having a relatively low compression yield strength to permit the block to be applied to a pipe accouterment with relatively low application pressure.

Still another object of the present invention is to provide a prefoamed block of polyurethane having no more than 20% open cell and preferably 8–12% open cells with a compression yield of between approximately 5 and 20 pounds per square inch while being dimensionally stable and holding both its structural and cell wall stability at low and elevated temperatures.

A further object of the present invention is to provide a shell covering the prefoamed polyurethane insert or block, which shell is tough and durable enough to withstand surface abuse while acting as a vapor barrier for the polyurethane foam.

Still another object of the present invention is to provide a prefoamed block of polyurethane having a shell therearound, having at least one open side, which polyurethane behaves like a friable material to permit localized deformation to conform to and assume substantially the shape of a pipe accouterment upon which it is forced, while exhibiting physical properties which permit shear to occur inwardly from the surface of the block upon impression therein by the accouterment.

Yet another object of the present invention is to provide a prefoamed block of polyurethane which is formed by foaming a predetermined formulation of a selected density with an open to closed cell ratio within a predetermined range enabling the foam blank to conform to the contour of a pipe accouterment to be insulated, while leaving sufficient undeformed material in the blank to provide the desired insulation while enabling the block to withstand the implosive pressures caused by low temperatures.

Another object of the present invention is to provide a prefoamed block of polyurethane insulation in which the cells of the polyurethane are oriented in a selected direction whereby a lower compression yield in a desired direction may be formed in the prefoamed block to enable the desired structural deformation of the block to be achieved when it is pressed against the valve accouterment to conform to the accouterment contour.

Other objects and a fuller understanding of the invention may be had by referring to the following specification and claims taken in conjunction with the accompanying drawings in which:

FIG. 1 is a fragmentary side elevational view showing an exemplary piping system having various pipe accounterments mounted therein with certain of the accouterments utilizing insulating blanks constructed in accordance with the present invention;

FIG. 2 is an enlarged, exploded perspective view of an insulator constructed in accordance with the present invention and separated from one of the accouterments of FIG. 1;

FIG. 3 is a schematic fragmentary view showing a step in the formation of one of the blanks;

FIG. 4 is a side elevational sectional view showing a subsequent step in the formation of the blank;

FIG. 5 is a perspective view of the blank formed in the manner shown in FIGS. 3 and 4;

FIG. 6 is a sectional view taken along line 6—6 of FIG. 5;

FIG. 7 is an enlarged fragmentary view of a portion of the insulator shown in dashed lines in FIG. 6 and labelled FIG. 7;

FIG. 8 is a schematic representation of the manner in which the insulator may be pressed onto a pipe accouterment;

FIG. 9 is a schematic representation of the method of preparing a pair of blanks for insulating the pipe accouterment;

FIG. 10 is a schematic perspective of a portion of the insulator shown in FIG. 9 after having been prepared for mounting on the accouterment shown in FIGS. 8 and 9;

FIG. 11 is a view of the accouterment as enclosed by the insulator shown in FIG. 10; and FIG. 12 is an enlarged fragmentary sectional view showing cell structure in both shear and localized collapse in areas of deformation caused by the accouterment pressing into the insulator.

Referring now to the drawings, and especially FIG. 1, a piping system 10 for conducting liquids or gas above and below ambient is illustrated, which system 10 includes a plurality of accouterments 11 therein for controlling and/or changing the direction and/or rate of flow of the gas or liquids carried by the piping system. As illustrated, in the present instance the accouterments 11 may include an elbow 12, a T 13 and a pair of guard valves 14 and 15 positioned on opposite sides of the T 13. It should be recognized, however, that the normal piping accouterments may include such items as reducers, traps, various safety blowoff valves, attachments and the like having what may generally be considered an irregular contour as compared with the pipe of the system. As illustrated in FIG. 1, the piping system comprises pipe 16 connecting the various accouterments 11, which pipe normally includes insulation or lagging 17 circumscribing the tubular piping and held in place, in the present instance, by straps 18.

In accordance with the invention, a novel insulator 20, is utilized to substantially enclose or sheathe the pipe accouterments 11, in the present instance and as shown in FIG. 1, the insulator 20 encloses the T 13 and the valve 15 and the position of proposed insulators for covering the elbow 12 and the valve 14 is shown in phantom lines. To this end, and as best illustrated in FIGS. 2 and 5, the insulator comprises at least a pair of blanks 21 each including a rigid outer shell 22 having at least one open side 23, and in the present instance four closed side walls 24 which taper axially of the blank merging into an upstanding end wall 25. As illustrated in FIG. 5, the shell 22 contains a block or insert 26 of foamed polyurethane having no more than 20% open cell content (preferably a closed cell content between 85 and 95%), and a compression yield strength of at least 5 p.s.i. and preferably in the range of 5–20 p.s.i. In the formulations of the prefoamed polyurethane block or insert 26, the polyurethane has preferably a coefficient of thermal conductivity no greater than 16 B.t.u. per hour, per square foot, per inch length, per degree F.

Typical formulations for achieving the desired compression yield, low coefficient of thermal conductivity, and other physical properties which are important to both the use and novel method of application of the insulator 20 to a piping accouterment 11, will be discussed hereinafter.

The novel method of making and applying an insulator 20 to a piping accouterment includes broadly the steps of: introducing into the shell a controlled amount of reactive mix to obtain the desired density blank 21, applying a pair of the blanks open side to open side on opposite sides of the accouterment, providing suitable apertures or cutouts for at least the pipe in the shells of the blanks, and forcing the blanks together deforming the polyurethane to substantially assume the shape of and conform to the exterior of the accouterment. To this end, and referring first to FIG. 3, the polyurethane formulation may first be injected into the shell 22 by a conventional mixing head 27. Preferably, as the shell is acting as a mold and to avoid the necessity of an overly thick-walled shell, a shell retainer 27a circumscribes the shell to prevent rupture thereof when the foam expands. A cover 28 (see FIG. 4) having suitable air vent holes 29 therein, is placed on top of the shell and a weight 30, or some other device such as clamping means connecting the cover to the retaining shell is provided for holding the cover in place. As is noted in FIG. 4, the cover 28 preferably includes a concave portion 31 in order, upon the expansion or foaming of the formulation, that at least a portion 26a of the block 26 projects outwardly from the peripheral edge 22a of the shell 22. In order to conserve material and to aid in aligning the blank against an accouterment, the cover may include a core mold 32 which projects downwardly into the shell 22 forming a dish or concavity 32a in the block 26.

As is well known, in the preparation of a foam block, a "free blow" of the blowing agent in the formulation, absent backpressure, tends to generate polyhedron-shaped cells 33 which are elongated in the direction of the free or open side of the mold. Thus the cells may be considered to be generally elliptical in shape having a long axis in the vertical direction. However, in a typical two pound per cubic foot density formulation, expansion is approximately 30 times that of the original volume of the non-reacted formulation, and upon the foam striking the lower surface of the cover 28, backpressure causes re-orientation of the polyhedron-shaped cells so that the generally elliptical form is as shown in FIG. 7, i.e. with the long axis of the polyhedron at right angles to the direction of backpressure caused by the foam striking the bottom of the cover 28. In addition, as is well known, the orientation of the cells 33 results in two different compression yield values, coincident with the direction of the short axis, the compression yield being less than in the direction of the long axis. By controlling the orientation of the axis of the foamed cells 33, the lower compression yield of the short axis may be utilized (as hereinafter described). Axis orientation is insured by charging the shell 22 with a sufficient quantity of formulation such that the short axis is at right angles to the cover 28 or the open side 23 of the shell.

After the blank 21 has been formed and cured, an insulator 20 may be used to sheathe or enclose an accouterment 11, such as the valve 15 shown in FIG. 1 by the novel method employed by the present invention. To this end, a pair of blanks 21 may be pressed against the valve body 15 until the pipe or insulation engages the periphery 22a of the shell 22, the depression 32a caused by the core mold 32 permitting accurate alignment of the two blanks 21 on opposite sides of the valve. As shown in FIGS. 8 and 9, this is accomplished by placing the blanks 21 in a blank holding and pressurizing device 40, similar to a C clamp. As best shown in FIG. 8, the pressurizing device, in the present instance, comprises a pair of inwardly disposed and aligned blank holders 41, which holders may be made adjustable to accommodate various dimensioned blanks. The holders 41 are connected through pressure members 42 which are internally threaded to accommodate a lead screw 43 whereby rotation of a crank handle 44, attached to the lead screw, causes the two blanks 21, positioned open side to open side, to be forced against the pipe accouterment until the pipe or insulation engages the periphery 22a of the shell 22.

If the shell 22 is composed of a thermoplastic material, such as rigid polyvinyl chloride (PVC), a soldering iron 34 having a plastic cutting tip 35 thereon may be used to cut apertures 36 coinciding with the diameter of the pipe 16. (See FIG. 9). Of course, in the event the lagging 17 extends interiorly of the blank, the cutout may coincide with the external diameter of the lagging 17, circumscribing the pipe 16. In addition, another cutout 37 is made in the upper side wall 24 of the shell 22 to accommodate the valve stem 15a. After the cutouts have been made, each blank 21 will be substantially of the appearance shown in FIG. 10 except some depression of the valve may be noted on the surface of the block 26.

After suitable cutouts have been made, continued pressure by the members 42 causes the blanks 21 to be forced together with the accouterment sandwiched therebetween, the accouterment causing the blocks 26 to deform and assume a shape substantially conforming to the contour of the valve. As shown in FIG. 11, pressure is continued until the blocks join or meet along at least some of their peripheral boundary thereby substantially enclosing or sheathing the accouterment. (See FIG. 11). Thus the pipe accouterment acts as its own die for molding the blocks of prefoamed polyurethane in situ to the desired external configuration of the accouterment.

There are several ways in which the blanks 21 may be secured to the accouterment, however it is preferable to coat the peripheral mating edges of the blocks 26 with a solvent activated adhesive, at the place of manufacture, so that by releasing pressure imposed by the device 40, separating the blanks 21 and wetting the adhesive with an appropriate solvent, re-application of pressure by the device 40 permits a bond to be formed along the peripheral boundary of the block.

In order to maintain the peripheral edges 22a of the shell 22 in intimate contact with each other, in the position shown in FIG. 11, it may be desirable to band the blanks together as by polypropylene strapping 45 or the like (see FIG. 1) applied in a known manner circumscribing the blanks 21. In addition, the shell 22 may be provided with circumferentially extending recesses 22b to accommodate such banding when desired. Also, in order to prevent vapor penetration into the prefoamed block of polyurethane 26, it may be desirable, where conditions warrant, to apply a sealant having vapor permeability characteristics as needed for the particular application. For example vinyl based tape with a suitable adhesive for the operating temperature conditions, or a caulking compound type of sealant may be used circumscribing the blanks along the junction 46 where the peripheral or marginal edges 22a of the shells 22 mate.

With regard to the shell proper, the shell construction and material is of particular importance when the insulator 20 is to be used in insulating an accouterment through which a low temperature liquid or gas is flowing. The reason for the shell construction and material being somewhat critical in this application, is that at low temperatures condensation of moisture is likely to occur interiorly of the insulation thus increasing the coefficient of thermal conductivity and diminishing the insulating qualities of the insulator. Thus under low temperature conditions the shell should act as a vapor barrier. The material of the shell should also be such as to provide a deterrent against the service abuse, which includes chemical solvent resistivity, physical abuse, etc. It is also possible with the use of a material such as polyvinyl chloride as the shell to color code the insulator 20 while providing a surface upon which pressure may be applied, as above-described, without fracturing the shell. Of course it should be recognized that there are other materials which may be used such as a rigid polystyrene, polypropylene, or even a steel or aluminum shell if such is necessary for the particular job requirement. However, a rigid polyvinyl chloride is particularly useful in this function in that it is relatively chemically inert, that is it resists acids, alkalis, solvents and so forth. As has heretofore been described, the shell is, in addition, preferably tapered away from its open face in order to provide a surface from which dirt, water, etc. may easily run off.

Referring now to the chemical composition of the polyurethane block 26, as is well known urethane foams are prepared from a polyisocyanate containing isocyanate (—NCO) groups and a polyol containing hydroxyl (—OH) groups together with catalysts, surfactants, etc., which under suitable conditions give, when mixed, a polyurethane foam. Typically, and more conventionally the polyisocyanate is tolylene diisocyanate (TDI), which is produced most economically as a mixture of isomers containing about 80% 2,4-tolylene diisocyanate. The polyols are readily available as glycols, polyethers, polyesters, etc.

In order to form a foam it is necessary that a blowing agent be added to the formulation causing a gas to be evolved during the reaction and forming the polyhedron cell structure as above-described and as shown in FIG. 7 of the drawings. Water, for example, when added in discrete quantities to the formulation reacts with the isocyanate to form carbon dioxide ($CO_2$) causing the formation of a foam. However, the coefficient of thermal conductivity of a rigid foam formed in the above-described manner (K of approximately .24), although good, is not as good as when the foam is formed by a halocarbon gas as the blowing agent. For example, trichloromonofluoromethane (refrigerant 11 which boils at 75° F.) of the group of halocarbons, is a particularly suitable blowing agent which may be used in low density foams. The reason for this is that the exotherm heat from the interaction of NCO and OH may be used to boil the halocarbon thus forming gas for foaming. Foams made with the above-mentioned halocarbon, for example, exhibit coefficients of thermal conductivity as low as .12 such that this foam is being used more and more in conventional applications for insulation in refrigerators, portable insulated chests, and insulated vehicles.

It is noted, however, that when using a conventional foam such as above-described a high density high compression yield foam must be formed because of the property of the halocarbon gas of condensing at extremely low temperatures causing collapse of the hollow cell. Thus, it is common practice to utilize foams, at least for low temperature application, having at least 20 and for the most part 25–35 p.s.i. compression yield strength. In addition, even at elevated temperatures, as the gas tends to expand, the foam must exhibit high tension yield properties so as to prevent explosion as opposed to implosion at depressed temperatures.

It has been discovered, due to the novel formulation of the prefoamed block of polyurethane used, that selected formulations not only provide an increase in compression yield as the temperature lowers, but also an increase in cell wall stability which prevents explosion at temperatures above ambient.

Below are set forth four examples of formulations in which the compression yield is maintained between 5 and 20 p.s.i., without exhibiting the normal tendency of cell wall rupture and collapse at significant depressed or elevated temperatures, and a stabilized K value not in excess of .16. A density of 1.45–1.85 lbs./cu.ft. has been found to be acceptable for pipe accouterment insulation, but densities may be practicable between 1 and 2 lbs. cu./ft. for the above-described insulating purposes.

FORMULATIONS

| Material | Amounts | | | |
|---|---|---|---|---|
| | A | B | C | D |
| Parts by weight: | | | | |
| Aromatic polyol, aliphatic amine modified [1] | 106 | 106 | 106 | 106 |
| Tolylene diisocyanate | 111 | 111 | 140 | 140 |
| Liquid silicone-glycol copolymer (surfactant) [2] | 1.5 | 1.5 | 1.5 | 1.5 |
| Dimethylethanolamine | | .4 | | 2.0 |
| Dibutyl tin dilaurate | .03 | | .03 | |
| Trichloromonofluoromethane | 60 | 60 | 60 | 60 |
| Organophosphorous foam flame retardant [3] | 2.6 | 15 | | 16.5 |
| Carbon black [4], percent | 0.5–2 / .25–3 | 0.5–2 | 0.5–2 | 0.5–2 |
| | | Preferably ½–2 | | |

[1] R–3500X of Jefferson Chemical Company, Inc. The particular polyol used is described in British Pat. No. 1,002,272, dated Aug. 25, 1965.
[2] DC 113 of Dow Corning Corporation.
[3] C–22–R of Monsanto Company.
[4] In variations of each formulation using amounts of carbon black ranging from 0.5 to 2%, by weight, based on the weight of the entire formulation, similar results are obtained, generally, the higher the percentage of carbon black, the greater the open cell content.

Prior to discussing the advantages and desirability of using controlled amounts of carbon black in the formulation, it should be noted that the glass point of a particular mix is important, the glass point being defined at that temperature at which a transition occurs and the material becomes stiff. Within a certain temperature range, as temperature decreases, the stiffness of a polyurethane foamed mass normally increases almost as a linear function with temperature. However, at the glass point, there is a sudden change or increase in stiffness. This has application in the present instance in that the glass point should be below the ambient or surface temperature of the accouterment to which the blocks are to be applied so as not to make the application of the blanks more difficult due to the increase in strength below the glass point.

In considering the reasons why at low temperatures the cells do not collapse, there are apparently several reasons for maintaining structural low temperature integrity: (1) by maintaining the "glass point" above the lower critical temperature limit, such as 23.7° F., with a trichloromonofluoromethane foaming agent stiffness is added to the structure above that critical temperature; and (2) the carbon black helps in preventing cell collapse.

By using controlled amounts of carbon black in the formulation, carbon black tends to interfere with the formation of cell walls thus creating a controlled increase in the quantity of open cells. The open cell structure tends to offset the effect of low temperature on the closed cells where the vacuum caused by the depressed temperature would cause cell collapse by reduction of internal support or gas pressure in the cell. Thus preferably an 8–12% open cell structure is formed to reduce the effect of low temperature on the polyurethane structure, but at any rate the foam should not have more than 20% open cell and preferably should exhibit a closed cell content between 88–92%.

Carbon black also materially aids the cell structure by localizing cell collapse when the blocks are deformed. As heretofore discussed, the blocks 26 associated with each blank 21 must deform so as to assume substantially the shape of and conform to the exterior of the accouterment being insulated. However, it is important that the deformation of the block be localized so that sufficient closed cells remain to provide the necessary insulation around the accouterment. Thus it is important that the friability (friable-like yet non- or minimal-dusting) be controlled to limit cell collapse to areas adjacent or contiguous with the surface formed by the accouterment. In this context, the addition of carbon black at about ¼ to 3% (preferably .5–2%) by weight provides an additional advantage as it increases the friability of the finished product. It is theorized that carbon black has the capability of being selectively absorptive of low molecular weight polymers which normally contribute to the internal sliding or the capability of the cell walls to deform and recover, thus making the formulation, once foamed and cured, more friable.

Referring now to FIGS. 2 and 12, the results of adding carbon black as a filler become more readily apparent. As noted in FIG. 12, the cells 33 have collapsed adjacent a deformed area 50 forming a collapsed cell structure layer or layers 33a. The friability of the preformed foam block is such as to permit shearing of the cells in planes normal to the open side 23 of the block 26, as is readily exhibited at 51 and 52 of FIG. 12. In addition, where the cells have been collapsed as at 33a, it is noted that the collapse is confined to the area immediately adjacent the surface which is deformed from contact with the accouterment. However, the cells immediately below the collapsed cells and adjacent the walls 51 and 52 appear, in cross section, to be of a normal size and shape, and thus the deformation caused by the accouterment in the block is such as to cause both localized deformation and shearing of the walls to conform to the shape of the accouterment.

Thus the addition of ½ to 3% carbon not only decreases the compression yield of the polyurethane block, but gives a foam of excellent friability maintaining the insulating qualities of closed and uncrushed cells despite the "deforming to conform," of the block by the accouterment.

It should also be noted that formulation with other types of fillers and extenders, other than carbon black, will permit control of the compression yield so as to fall into a practical working range for the application as heretofore described. For example, such materials as barium and calcium sulfate and aluminum silicate in commercially available forms generally depress the compression yield values by addition of approximately 10% by weight of these fillers to the formulations above-described. However, it should be recognized that the control of the formulation to achieve the desired result is more easily accomplished with carbon black than with other fillers and extenders.

In addition, friable-like characteristics may be controlled separately by using an excess of the isocyanate groups, however, a block 26 having excess isocyanate in the formulation should be used within a reasonable time after formation unless it is sealed from the atmosphere. The reason for this is that the excess isocyanate will tend to unite with water vapor in the atmosphere tending to increase the compression yield value making it difficult to apply the block to an accouterment because of the excessive force required to place the block onto the accouterment.

It also should be noted that by adding a blocked amine, such as a boron trifluoride complex of, for example, monoethylamine, piperazine, etc., the initial friability of a formulation containing carbon black can be eliminated after the block has been deformed to assume a shape conforming to the accouterment. This may be accomplished by subjecting the block to temperatures of 160° F. or higher which permits the freed amine to react to give longer cross linking or polymer chains thus increasing the physical strength resulting in both a higher compression yield, once in place, and higher tensile strength. Such formulations as described, would be particularly useful as insulators when the accouterment to be insulated is used in conjunction with a piping system conducting liquids or gases at temperatures in excess of 160° F. and preferably in excess of 200° F.

The use of carbon black in the formulations such as heretofore described has real and definite advantages both for insulating purposes and for impact absorption purposes. For example, manufacturing a polyurethane foam having a yield in excess of 20 p.s.i. and with a closed cell content in excess of 80% may be useful for impact padding because of the ability of the foam to have a linear compression yield rate per unit depth. This means that, for example, if the compression yield is 25 p.s.i. at the outer surface of the foam, after a deformation of one inch the compression yield value is still 25 p.s.i. Thus a uniform de-acceleration of an object striking the foam may be obtained by utilizing a foam substantially as described above, and as set forth in the examples, but with a higher compression yield.

As impact absorption members, the foam may be used as abutments along the sides of a highway being backed up by suitable restraining members so as to permit vehicular impact and absorption of energy by the foam upon impact. The ease of replacement, cost of material, and lightness of weight makes such a material highly desirable for such a use. In addition, it has been proposed to provide the front and rear bumpers of motor vehicles with tubular, telescopically engaging support members connecting the bumpers to the vehicle, the telescopically engaged structures being provided with a shock absorption media therein. A cylindrical block or element of polyurethane foam having a relatively high compression yield may be utilized in the telescopically engaging structures for energy absorption upon impact of the bumper of the vehicle with another object. As the novel foam described above does not have the ability to reassume its original shape after impact, of course foam elements or abutments will have to be replaced after deformation caused by impact.

A foam having a higher compression yield than that suitable for insulation may be formed by substituting, for example, in the above sample formulations, water in lieu of the trichloromonofluoromethane and permitting the water to form carbon dioxide when reacted with the isocyanate.

Thus the novel polyurethane foam, when formulated within the limits as above described, forms a superior and inexpensive insulator as well as, with slight changes in formulation, an excellent impact absorption medium.

Although the invention has been described with a certain degree of particularity, it is understood that the present disclosure has been made only by way of example and that numerous changes in the details of construction, method of application, and the combination and arrangement of parts may be made without departing from the spirit and the scope of the invention as hereinafter claimed.

What is claimed is:

1. A method of insulating a piping accouterment comprising the steps of supplying at least a pair of blanks, each blank including: an outer shell having one completely open side and of a material which may be readily cut to provide openings affording passage of a portion of the piping accouterment therethrough; and a foamed polyurethane block in each of said shells projecting outwardly of said one open side; said block having a friability to permit shear to occur in the cell structure and to permit cell collapse upon application of external physical pressure greater than 5 p.s.i.; positioning said blanks on opposite sides of said accouterment; forcing said blanks together with said accouterment therebetween to cause the outwardly projecting parts of one of said blocks to mate with a corresponding part of said other blank along at least some of their peripheral boundary, substantially enclosing said accouterment and causing said foam to shear and deform and assume a shape substantially conforming to the portion of the accouterment impressed therein; and holding one of said pair of blanks in position against the other of said pair of blanks thereby insulating said accouterment.

2. A method according to claim 1 including the additional step of securing said blanks together and sealing the same so as to substantially sheath said accouterment.

3. A method of insulating a piping accouterment comprising the steps of providing at least a pair of blanks including an outer shell having at least one open side, and a foamed polyurethane block in each of said shells having a compression yield strength of at least 5 p.s.i. and a friability to permit shear to occur in the cell structure along said open side and to permit cell collapse upon application of external physical pressure greater than 5 p.s.i., along with a coefficient of thermal conductivity no greater than .16 B.t.u.'s per hour, per square foot, per inch length, per degree F.; positioning said blanks on opposite sides of said accouterment; applying an external physical pressure greater than 5 p.s.i. to said blanks to force the same together, with the accouterment therebetween, until the block in one of said blanks mates with a corresponding part in the other blank and collapses the cell structure of the foam in said block, the accouterment shearing and collapsing the cell structure of the foam in at least one of said blanks to cause the same to deform and assume a shape substantially conforming to the portion of the accouterment impressed therein, whereby said pair of blanks encloses said accouterment so as to thoroughly insulate the same.

4. A method of applying insulation to piping accouterments comprising the steps of: providing at least a pair of blanks each having an outer shell and at least one open side and filled with a polyurethane foam block; aligning said blanks on opposite sides of an accouterment, bringing said blanks together until they engage on opposite sides of said accouterment, cutting said shell to permit extension from said accouterment externally of said blanks; applying said blanks to opposite sides of said accouterment and causing said foam to deform and assume a shape substantially conforming to the portion of said accouterment impressed therein; said pressure being great enough to cause said blocks to mate along at least some of their peripheral boundary; and binding said blanks together so as to substantially sheath said accouterment.

References Cited

UNITED STATES PATENTS

| | | | |
|---|---|---|---|
| 3,070,476 | 12/1962 | Miller | 161—119 |
| 3,258,126 | 6/1966 | Flower et al. | 264—45 |
| 3,370,117 | 2/1968 | Blue | 264—321 |
| 3,631,898 | 1/1972 | Harley | 156—228 X |

ROBERT F. BURNETT, Primary Examiner

H. F. EPSTEIN, Assistant Examiner

U.S. Cl. X.R.

156—228, 250, 258, 303.1; 161—120, 139, 160, 190; 264—321